(12) United States Patent
Eastlake, III et al.

(10) Patent No.: US 10,757,066 B2
(45) Date of Patent: *Aug. 25, 2020

(54) ACTIVE-ACTIVE ACCESS TO TRANSPARENT INTERCONNECTION OF LOTS OF LINKS (TRILL) EDGES

(71) Applicant: Futurewei Technologies, Inc., Plano, TX (US)

(72) Inventors: Donald Eggleston Eastlake, III, Milford, MA (US); Yizhou Li, Nanjing (CN); Weiguo Hao, Nanjing (CN)

(73) Assignee: Futurewei Technologies, Inc., Plano, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 16/133,374

(22) Filed: Sep. 17, 2018

(65) Prior Publication Data

US 2019/0020618 A1    Jan. 17, 2019

Related U.S. Application Data

(63) Continuation of application No. 14/711,408, filed on May 13, 2015, now Pat. No. 10,104,035.

(Continued)

(51) Int. Cl.
*H04L 12/28* (2006.01)
*H04L 29/12* (2006.01)
(Continued)

(52) U.S. Cl.
CPC ............ *H04L 61/103* (2013.01); *H04L 12/18* (2013.01); *H04L 12/4633* (2013.01); *H04L 45/66* (2013.01); *H04L 49/253* (2013.01)

(58) Field of Classification Search
None
See application file for complete search history.

(56) References Cited

U.S. PATENT DOCUMENTS

| 9,755,970 B2 | 9/2017 | Zhai et al. |
| 9,769,016 B2 | 9/2017 | Vobbilisetty et al. |

(Continued)

FOREIGN PATENT DOCUMENTS

| CN | 102647324 A | 8/2012 |
| CN | 102710510 A | 10/2012 |

(Continued)

OTHER PUBLICATIONS

Machine Translation and Abstract of Chinese Publication No. CN102769567, Nov. 7, 2012, 10 pages.

(Continued)

*Primary Examiner* — Bob A Phunkulh
(74) *Attorney, Agent, or Firm* — Conley Rose, P.C.

(57) ABSTRACT

An apparatus configured to provide active-active access to a transparent interconnection of lots of links (TRILL) campus. The apparatus includes a first access port associated with a first customer equipment (CE) and a second access port associated with a second CE. The first access port is configured to receive a frame from the first CE. The apparatus includes a processor configured to replicate the frame to generate a replicated frame, determine that a pseudo-nickname associated with the first access port and the pseudo-nickname associated with the second access port are the same, and determine that the first access port and the second access port are associated with different multi-chassis link aggregations (MC-LAGs). The apparatus also includes a transmitter configured to forward the replicated frame to the second CE using the second access port.

12 Claims, 9 Drawing Sheets

Related U.S. Application Data (60) Provisional application No. 61/992,767, filed on May 13, 2014.

(51) Int. Cl.
*H04L 12/937* (2013.01)
*H04L 12/18* (2006.01)
*H04L 12/46* (2006.01)
*H04L 12/721* (2013.01)

(56) References Cited

U.S. PATENT DOCUMENTS

| | | | |
|---|---|---|---|
| 2010/0246388 A1* | 9/2010 | Gupta | H04L 12/4625 370/225 |
| 2011/0019678 A1 | 1/2011 | Mehta et al. | |
| 2011/0235523 A1 | 9/2011 | Jha et al. | |
| 2011/0255540 A1 | 10/2011 | Mizrahi et al. | |
| 2011/0299527 A1 | 12/2011 | Yu et al. | |
| 2011/0299534 A1 | 12/2011 | Koganti et al. | |
| 2011/0299535 A1 | 12/2011 | Vobbilisetty et al. | |
| 2011/0299536 A1 | 12/2011 | Cheng et al. | |
| 2012/0033668 A1* | 2/2012 | Humphries | H04L 12/185 370/390 |
| 2012/0033672 A1* | 2/2012 | Page | H04L 45/245 370/395.53 |
| 2012/0033678 A1* | 2/2012 | Page | H04L 45/28 370/401 |
| 2012/0163164 A1 | 6/2012 | Terry et al. | |
| 2012/0182866 A1* | 7/2012 | Vinayagam | H04L 45/245 370/228 |
| 2013/0003738 A1 | 1/2013 | Koganti et al. | |
| 2013/0003739 A1 | 1/2013 | Raman et al. | |
| 2013/0051235 A1 | 2/2013 | Song et al. | |
| 2014/0071987 A1 | 3/2014 | Janardhanan et al. | |
| 2014/0122704 A1 | 5/2014 | Wang | |
| 2014/0254374 A1 | 9/2014 | Janakiraman et al. | |
| 2014/0293827 A1* | 10/2014 | Kumar | H04L 12/4675 370/254 |
| 2015/0023352 A1 | 1/2015 | Yang et al. | |
| 2015/0139233 A1 | 5/2015 | Zhai et al. | |
| 2015/0139234 A1 | 5/2015 | Hu | |

FOREIGN PATENT DOCUMENTS

| | | |
|---|---|---|
| CN | 102769567 A | 11/2012 |
| CN | 103209132 A | 7/2013 |
| EP | 2670088 B1 | 11/2015 |
| WO | 2013185532 A1 | 12/2013 |

OTHER PUBLICATIONS

Machine Translation and Abstract of Chinese Publication No. CN103209132, Jul. 17, 2013, 36 pages.
Li, Y., et al., "Problem Statement and Goals for Active-Active Connection at the Transparent Interconnection of Lots of Links (TRILL) Edge," Internet Engineering Task Force (IETF), Request for Comments: 7379, Oct. 2014, pp. 1-13.
Hao, W., et al., "Analysis of Active-Active connection solutions," draft-hao-trill-analysis-active-active-01.txt, Feb. 14, 2014, 14 pages.
Zhai, H., et al., "RBridge: Pseudo-Nickname," draft-hu-trill-pseudonode-nickname-06, Feb. 14, 2014, 20 pages.
Hao, W., et al., "Frame Duplication Avoidance for TRILL Active-Active Access," draft-hao-trill-dup-avoidance-active-active-01.txt, Feb. 14, 2014, 9 pages.
Perlman, R., et al., "Introduction to TRILL," The Internet Protocol Journal, vol. 14, No. 3, Sep. 2011, 32 pages.
Hiao, W., et al., "The problem statement of RBridge edge group state synchronization," draft-hao-trill-rb-syn-02.txt, Feb. 12, 2014, 16 pages.
Foreign Communication From a Counterpart Application, PCT Application No. PCT/US2015/030593, International Search Report dated Aug. 21, 2015, 5 pages.
Foreign Communication From a Counterpart Application, PCT Application No. PCT/US2015/030593, Written Opinion dated Aug. 21, 2015, 8 pages.
Oreign Communication From a Counterpart Application, Chinese Application No. 201580001567.3, Chinese Office Action dated May 2, 2018, 3 pages.
Foreign Communication From a Counterpart Application, Chinese Application No. 201580001567.3, Chinese Search Report dated Apr. 20, 2018, 2 pages.
Office Action dated Dec. 1, 2016, 15 pages, U.S. Appl. No. 14/711,408, filed May 13, 2015.
Notice of Allowance dated Feb. 1, 2018, 10 pages, U.S. Appl. No. 14/711,408, filed May 13, 2015.
Notice of Allowance dated Oct. 11, 2017, 7 pages, U.S. Appl. No. 14/711,408, filed May 13, 2015.
Notice of Allowance dated Jun. 12, 2017, 5 pages, U.S. Appl. No. 14/711,408, filed May 13, 2015.
Perlman, et al., "Routing Bridges (RBridges): Base Protocol Specification," RFC 6325, Jul. 2011, 99 pages.

* cited by examiner

ACTIVE-ACTIVE ACCESS TO TRANSPARENT INTERCONNECTION OF LOTS OF LINKS (TRILL) EDGES

CROSS-REFERENCE TO RELATED APPLICATIONS

This application is a continuation of co-pending U.S. patent application Ser. No. 14/711,408 filed May 13, 2015, by Donald Eastlake, et al., and titled "Active-Active Access to Transparent Interconnection of Lots of Links (TRILL) Edges," which claims the benefit of U.S. Provisional Patent Application No. 61/992,767 filed May 13, 2014, by Donald Eastlake, et al., and titled "Processes for Implementing Active-Active Access to Trill Edges," each of which is incorporated by reference in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

In traditional internet protocol (IP) version 4 (IPv4) and IP version 6 (IPv6) networks, a node in multiple subnets may have multiple IP addresses. Administration of the IPv4 and IPv6 networks is complicated because routers have to reconfigure the IP address every time the node moves from one subnet to another one. Therefore, careful IP address management is required to avoid creating subnets that are sparsely populated in order to save the IP addresses.

Transparent interconnection of lots of links (TRILL) protocols are proposed to address this issue as described in Internet Engineering Task Force (IETF) Request for Comments (RFC) 6325, "Routing Bridges (RBridges): Base Protocol Specification," which is incorporated herein by reference ("IETF RFC 6325").

SUMMARY

In one embodiment, the disclosure includes an apparatus configured to provide active-active access to a transparent interconnection of lots of links (TRILL) campus. The apparatus includes a first access port associated with a first customer equipment (CE) and a second access port associated with a second CE. The first access port configured to receive a frame from the first CE. The apparatus includes a processor coupled to the first access port and the second access port. The processor is configured to replicate the frame to generate a replicated frame, determine that a pseudo-nickname associated with the first access port and the pseudo-nickname associated with the second access port are the same, and determine that the first access port and the second access port are associated with different multichassis link aggregations (MC-LAGs). The apparatus also includes a transmitter coupled to the processor. The transmitter is configured to forward the replicated frame to the second CE using the second access port.

In another embodiment, the disclosure includes an apparatus configured to provide active-active access to a transparent interconnection of lots of links (TRILL) campus. The apparatus includes a first access port associated with a first customer equipment (CE) and a second access port associated with a second CE. The first CE is configured to receive a frame from the first CE. The apparatus includes a processor coupled to the first access port and the second access port. The processor is configured to replicate the frame to generate a replicated frame, determine that a pseudo-nickname associated with the first access port and a pseudo-nickname associated with the second access port are different, and determine that the second access port is a designated forwarding port. The apparatus also includes a transmitter coupled to the processor. The transmitter is configured to forward the replicated frame to the second CE using the second access port.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that, although illustrative implementations of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Figure 1:
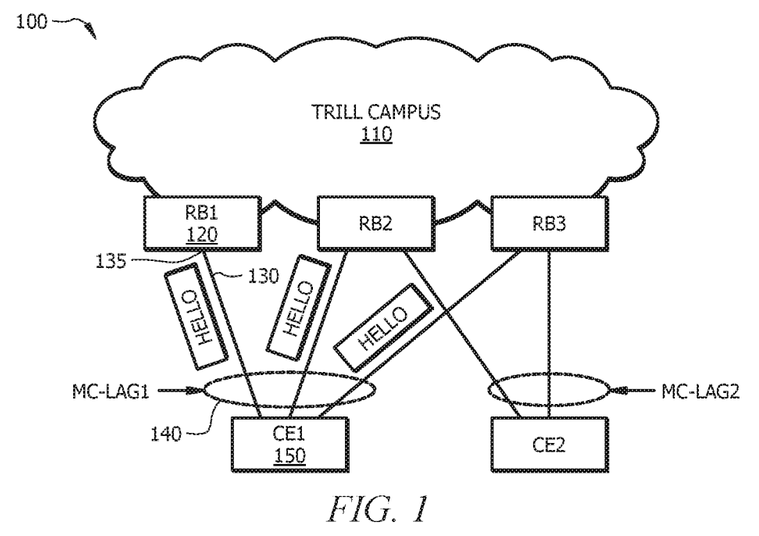
FIG. 1 is a schematic diagram of a network.

FIG. 1 is a schematic diagram of a network 100. The network 100 comprises a transparent interconnection of lots of links (TRILL) campus 110 and two pieces of customer equipment (CE) 150 (e.g. CE1 and CE2). The network 100 may be configured as shown or in any other suitable manner.

The TRILL campus 110 comprises a plurality of routing bridges (RBs) 120, which are interconnected. FIG. 1 shows three RBs 120 (e.g. RB1, RB2, and RB3) at an edge of the TRILL campus 110. The RBs 120 are configured to forward frames in the TRILL campus 110. In an embodiment, the RBs 120 are routers. In another embodiment, the RBs 120 are any other network components that are configured to forward frames, for example, switches. The CE 150 may be a computer or a server and configured to transmit the frames to the TRILL campus 110 or receive the frames from the TRILL campus 110. The RBs 120 at the edge of the TRILL campus 110 (e.g. RB1, RB2, and RB3) and CEs 150 are coupled with links 130, which may be either wireless channels or cables.

The Internet Engineering Task Force (IETF) Request for Comments (RFC) 6325 describes a system that has excellent performance in load sharing and failure recovery inside the TRILL campus 110. However, at the edges, the IETF RFC 6325 provides limited load sharing across links 130 and may respond slowly to failures in the RBs 120 and links 130.

An active-active access in the network utilizes multi-chassis link aggregation (MC-LAG) 140 (e.g. MC-LAG1, and MC-LAG2) to connect a group of RBs 120 at the edge of the TRILL campus 110 to CEs 150 via access ports 135, which enables efficient traffic load spread from RBs 120 to CEs 150. Additionally, the active-active access provides high reliability by allowing for rapid failure detection. The IETF RFC 6325 requires that only one of a group of RBs 120 is able to forward a frame as an appointed forwarder to one or more CEs 150 which are connected with the group of RBs 120. However, the IETF RFC 6325 may not guarantee active-active access under some circumstances. For example, as shown in FIG. 1, multiple links 130 are connected to CE1 150. Every RB 120 forwards a "Hello" frame to CE1 150. One RB 120 may not see the "Hello" message from another RB 120. Therefore, every RB 120 thinks of itself as the appointed forwarder.

Figure 2:
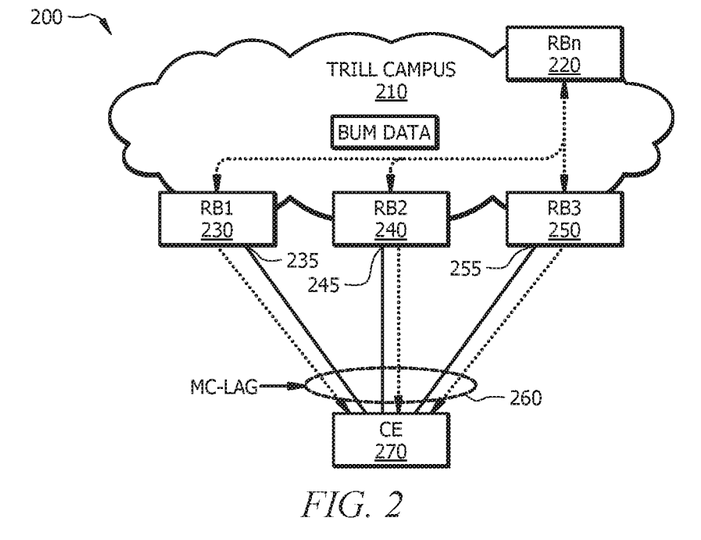
FIG. 2 is a schematic diagram of another network.
Figure 3:
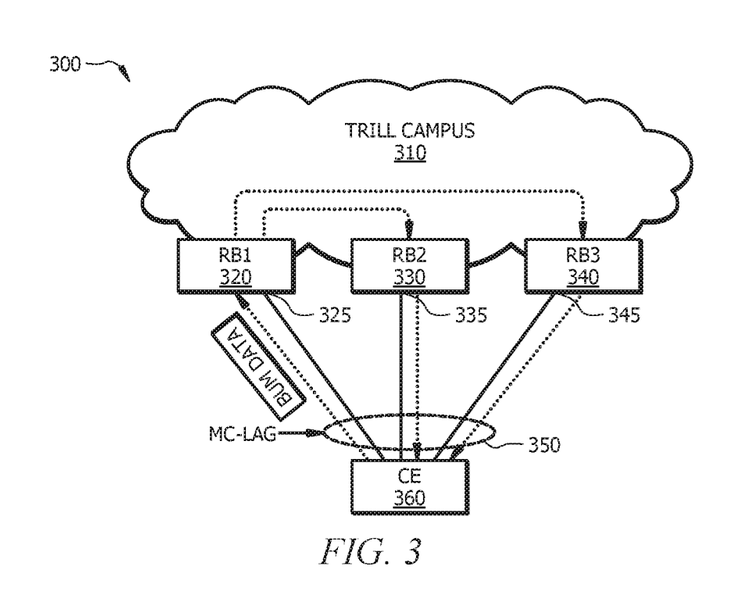
FIG. 3 is a schematic diagram of yet another network.
Figure 4:
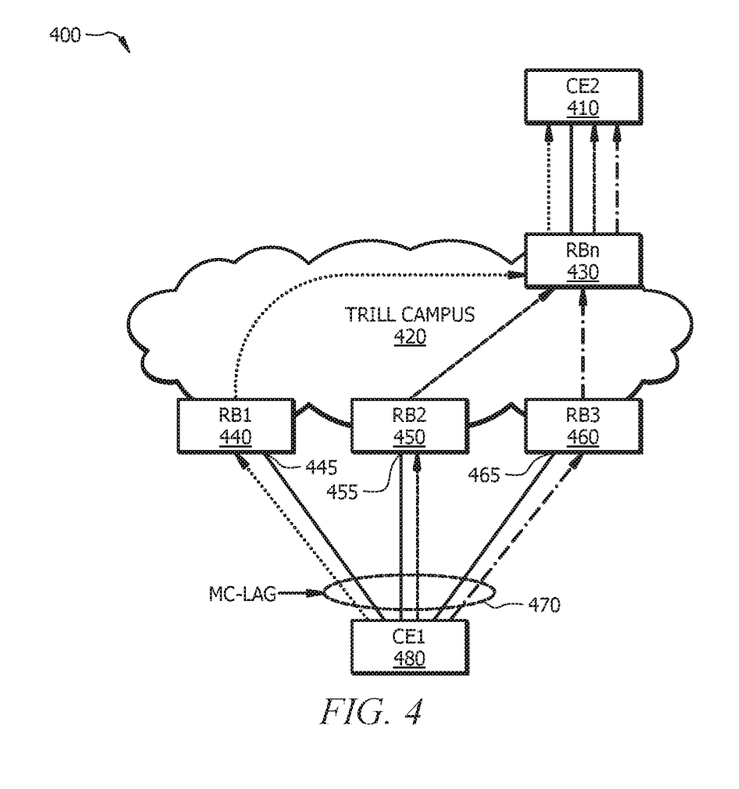
FIG. 4 is a schematic diagram of yet another network.

There are numerous problems to overcome with implementing active-active access in a network. FIGS. 2-4 show three major problems with possible solutions. These problems and solutions are enumerated in IETF RFC 7379, "Problem Statement and Goals for Active-active access at the Transparent Interconnection of Lots of Links (TRILL) Edge," which is incorporated herein by reference.

FIG. 2 is a schematic diagram of another network 200. The network 200 comprises a TRILL campus 210 and a CE 270. The TRILL campus 210 and the CE 270 are similar to the TRILL campus 110 and the CE 150. FIG. 2 shows RB1 230, RB2 240, and RB3 250 at an edge of the TRILL campus 210 and RBn 220 at another edge of the TRILL campus 210. RB1 230, RB2 240, RB3 250, and RBn 220 are similar to the RBs 120 in FIG. 1. Also similar to FIG. 1, an active-active access in the network 200 utilizes MC-LAG 260 to connect RB1 230, RB2 240, and RB3 250 to the CE 270 via an access port 235 of RB1 230, an access port 245 of RB2 240, and an access port 255 of RB3 250, respectively.

After RBn 220 sends a multi-destination TRILL data frame into the TRILL campus 210, each of RB1 230, RB2 240, and RB3 250 receives the TRILL data frame, and forward the payload frame inside that TRILL data frame to the CE 270 utilizing the MC-LAG 260. The payload frame may be one of a broadcast frame, a unicast frame, and a multicast frame. Therefore, the payload frame is generally referred to as a flooded broadcast, unicast, or multicast (BUM) data frame. One problem with such a configuration is that the CE 270 receives the same frame from each of RB1 230, RB2 240, and RB3 250, which is unnecessary and may confuse CE 270. A possible solution is to assign one of the access port 235 of RB1 230, the access port 245 of RB2 240, and the access port 255 of RB3 250 as a designated forwarder (DF) port. Only the DF port is allowed to forward the payload frame to the CE 270.

FIG. 3 is a schematic diagram of yet another network 300. The network 300 comprises a TRILL campus 310 and a CE 360. The TRILL campus 310 and the CE 360 are similar to the TRILL campus 110 and the CE 150. FIG. 3 shows RB1 320, RB2 330, and RB3 340 at an edge of the TRILL campus 310, which are similar to RB1 120 in FIG. 1. Similar to FIG. 1, an active-active access in the network 300 utilizes MC-LAG 350 to connect RB1 320, RB2 330, and RB3 340 to the CE 360 via an access port 325 of RB1 320, an access port 335 of RB2 330, and an access port 345 of RB3 340, respectively.

After receipt of a BUM data frame from the CE 360, RB1 320 encapsulates the BUM data frame as the payload of a multi-destination TRILL data frame and sends the multi-destination TRILL data frame into the TRILL campus 310. Both RB2 330 and RB3 340 receive the frame. A problem is both RB2 330 and RB3 340 may forward the frame to the CE 360, which transmitted the frame originally. Therefore, a loop is formed. A possible solution is to assign pseudo-nicknames to the access port 325 of RB1 320, the access port 335 of RB2 330, and the access port 345 of RB3 340. Since all the access port 325 of RB1 320, the access port 335 of RB2 330, and the access port 345 of RB3 340 are associated with the same MC-LAG 350, they are considered as virtual RBs and are assigned the same pseudo-nickname. RB1 320 encapsulates the frame with this pseudo-nickname and sends the encapsulated frame into the TRILL campus. Upon receipt of the encapsulated frame, RB2 330 and RB3 340 decapsulate the encapsulated frame, and obtain the pseudo-nicknames and the frames. RB2 330 and RB3 340 do not forward the frames to the CE 360 since the pseudo-nicknames obtained from the encapsulated frames are the same as the pseudo-nicknames associated with the access port 335 of RB2 330 and the access port 345 of RB3 340. Therefore, the loop is avoided. However, a huge number of pseudo-nicknames may be needed in a complex network with a large number of MC-LAGs, which may result in memory overflow.

FIG. 4 is a schematic diagram of yet another network 400. The network 400 comprises a TRILL campus 420, CE1 480, and CE2 410. The TRILL campus 420 is similar to the TRILL campus 110. CE1 480 and CE2 410 are similar to the CE 150. FIG. 4 shows RB1 440, RB2 450, and RB3 460 at an edge of the TRILL campus 420 and RBn 430 at another edge of the TRILL campus 420. RB1 440, RB2 450, RB3 460, and RBn 430 are similar to RB1 120 in FIG. 1. Similar to FIG. 1, an active-active access in the network 400 utilizes MC-LAG 470 to connect RB1 440, RB2 450, and RB3 460 to CE1 480 via an access port 445 of RB1 440, an access port 455 of RB2 450, and an access port 465 of RB3 460, respectively.

As shown in FIG. 4, CE1 480 sends frames to RB1 440, RB2 450, and RB3 460 with the same source media access control (MAC) address, the choice between RB1 440, RB2 450, or RB3 460 being made by MC-LAG 470. Each of the RBs which receive a frame (e.g., RB1 440, RB2 450, or RB3 460) may encapsulate the frame with its own individual nickname, and send the encapsulated frame to the TRILL campus 420. RBn 430 receives all the encapsulated frames, which comprise the same source MAC address but with different nicknames. This may be regarded as a severe network problem by RBn 430 and RBn 430 might discard such traffic and notify the network operator or engage in other undesired behavior. As a consequence, RBn 430 may encapsulate returned frames from CE2 410 destined for CE1 480 into the TRILL campus 420 using the nickname for RB1 440, RB2 450, or RB3 460, causing the encapsulated frames to go through different paths back to CE1 480, which may result in persistent reordering of the frames. Assigning the same pseudo-nickname to the access port 445 of RB1 440, the access port 455 of RB2 450, and the access port 465 of RB3 460 may solve the problems. However, as discussed above, a huge number of pseudo-nicknames may be needed in a complex network with a large number of MC-LAGs 470, which may result in memory overflow.

Disclosed herein are embodiments for implementing active-active access on TRILL edges. The disclosed embodiments may reduce usage of nicknames by about two orders of magnitude by assigning pseudo-nicknames on access ports of RBs. The RBs at an edge of a TRILL campus designate each access port as one of an MC-LAG DF port, an MC-LAG non-DF port, and a non MC-LAG port. Each access port is associated with a pseudo-nickname as long as the access port is not a non MC-LAG port. For example, a first access port is associated with a first pseudo-nickname, and a second access port is associated with a second pseudo-nickname. The first pseudo-nickname and the second pseudo-nickname are the same when a first CE coupled to the first access port and a second CE coupled to the second access port are coupled to the same group of the RBs. In this case, a frame received via the first access port from the first CE is replicated, and the replicated frame is then forwarded via the second access port to the second CE. On the other hand, the first pseudo-nickname and the second pseudo-nickname are different when the first CE and the second CE are coupled to a different group of the RBs. In this case, the frame received via the first access port from the first CE is replicated and the replicated frame is then forwarded via the second access port to the second CE only when the second access port is designated as a MC-LAG DF port. Each RB may have more than two access ports, which may be coupled to more than two CEs.

Figure 5:
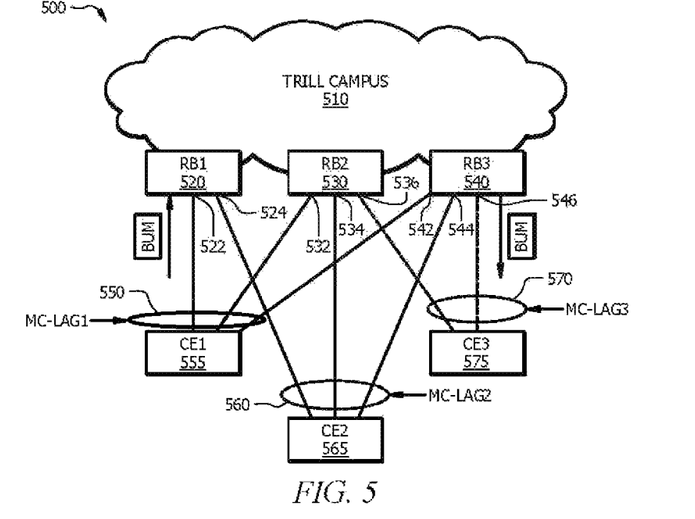
FIG. 5 is a schematic diagram of yet another network.

FIG. 5 is a schematic diagram of yet another network 500. The network 500 comprises a TRILL campus 510, CE1 555, CE2 565, and CE3 575. The network 500 may be configured as shown or in any other suitable manner.

The TRILL campus 510 comprises a plurality of RBs, including RB1 520, RB2 530, and RB3 540 at the edge of the TRILL campus 510. The TRILL campus 510 and the RBs (e.g. RB1 520, RB2 530, and RB3 540) are similar to the TRILL campus 110 and RBs 120 in FIG. 1. In an embodiment, the RBs, including RB1 520, RB2 530, and RB3 540 are routers. In another embodiment, the RBs, including RB1 520, RB2 530, and RB3 540 are any other network components that are configured to forward frames, for example switches. RB1 520 comprises a first access port 522 and a second access port 524. RB2 530 comprises a first access port 532, a second access port 534, and a third access port 536. RB3 540 comprises a first access port 542, a second access port 544, and a third access port 546.

The CEs (e.g. CE1 555, CE2 565, and CE3 575) are similar to the CEs 150 in FIG. 1. In an embodiment, each of CE1 555, CE2 565, and CE3 575 is one of a computer and a server. An active-active access in the network 500 utilizes MC-LAG1 550 to connect RB1 520, RB2 530, and RB3 540 to CE1 555 via the first access port 522 of RB1 520, the first access port 532 of RB2 530, and the first access port 542 of RB3 540, respectively. The active-active access in the network 500 utilizes MC-LAG2 560 to connect RB1 520, RB2 530, and RB3 540 to CE2 565 via the second access port 524 of RB1 520, the second access port 534 of RB2 530, and the second access port 544 of RB3 540, respectively. The active-active access in the network 500 utilizes MC-LAG3 570 to connect RB2 530 and RB3 540 to CE3 575 via the third access port 536 of RB2 530 and the third access port 546 of RB3 540, respectively.

Figure 6:
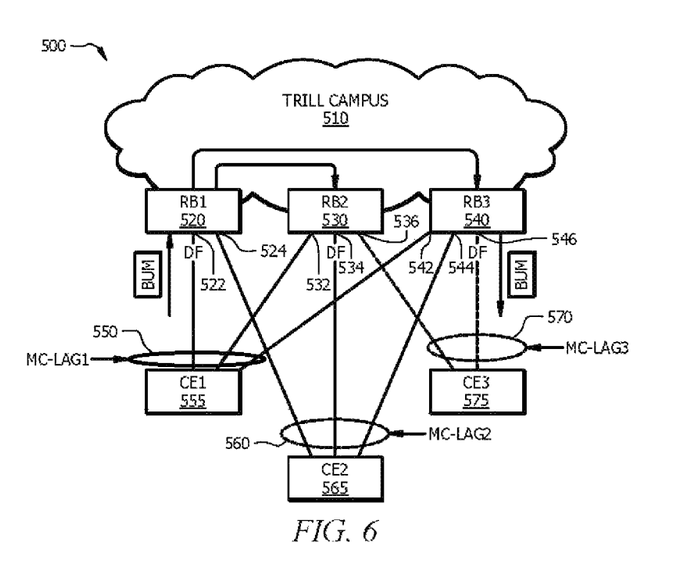
FIG. 6 is another schematic diagram of the network in FIG. 5.
Figure 7:
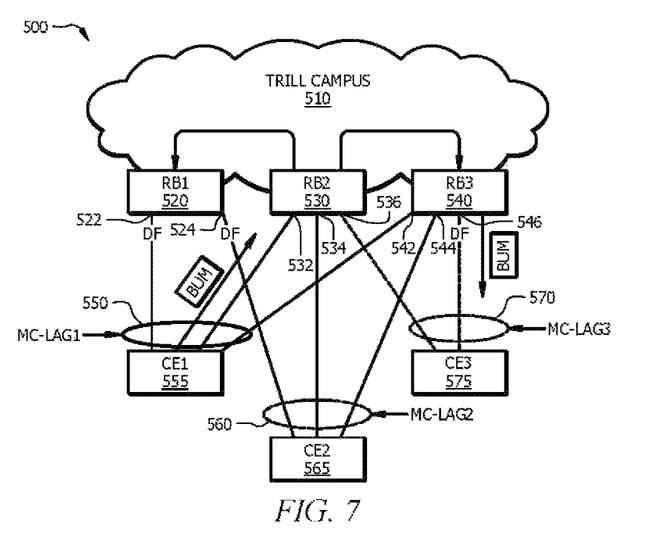
FIG. 7 is yet another schematic diagram of the network in FIG. 5.

Before implementing active-active access on TRILL edges, each access port of the RBs is designated as one of a non MC-LAG port, an MC-LAG non-DF port, and an MC-LAG DF port. When an access port is not associated with an MC-LAG, the access port of the RB is a non MC-LAG port. Otherwise, the access port is either an MC-LAG non-DF port or an MC-LAG DF port and is generally referred to as an MC-LAG port. Only one access port associated with an MC-LAG is designated as an MC-LAG DF port. The MC-LAG DF port may be selected arbitrarily for each MC-LAG. All other access ports associated with the MC-LAG excluding the MC-LAG DF port are designated as MC-LAG non-DF ports. For example, all the access ports in FIG. 5 are associated with MC-LAG1 550, MC-LAG2 560, or MC-LAG3 570. Therefore, the access ports in FIG. 5 are either MC-LAG DF ports or MC-LAG non-DF ports. There are numerous ways of assigning MC-LAG DF ports and MC-LAG non-DF ports. FIG. 6 and FIG. 7 show two examples.

FIG. 6 is another schematic diagram of the network 500 in FIG. 5. As can be seen, the first access port 522 of RB1 520, the second access port 534 of RB2 530, and the third access port 546 of RB3 540 are designated as MC-LAG DF ports. On the other hand, the second access port 524 of RB1 520, the first access port 532 of RB2 530, the third access port 536 of RB2 530, the first access port 542 of RB3 540, and the second access port 544 are designated as MC-LAG non-DF ports.

FIG. 7 is yet another schematic diagram of the network 500 in FIG. 5. As can be seen, the first access port 522 of RB1 520, the second access port 524 of RB1 520, and the third access port 546 of RB3 540 are designated as MC-LAG DF ports. On the other hand, the first access port 532 of RB2 530, the second access port 534 of RB2 530, the third access port 536 of RB2 530, the first access port 542 of RB3 540, and the second access port 544 of RB3 540 are designated as MC-LAG non-DF ports. When an access port is an MC-LAG port, the access port is associated with a pseudo-nickname. For example, a first access port is associated with a first pseudo-nickname, and a second access port is associated with a second pseudo-nickname. The first pseudo-nickname and the second pseudo-nickname are the same when a first CE coupled to the first access port and a second CE coupled to the second access port are coupled to the same group of RBs. For example, as shown in FIGS. 5-7, the first access port 522 of RB1 520 is coupled to CE1 555. The second access port 524 of RB1 520 is coupled to CE2 565. Both CE1 555 and CE2 565 are coupled to a same first group of RBs, including RB1 520, RB2 530, and RB3 540. Therefore, the first access port 522 of RB1 520 and the second access port 524 of RB1 520 are associated with a same pseudo-nickname, PN1. Similarly, the first access port 532 of RB2 530, the second access port 534 of RB2 530, the first access port 542 of RB3 540 and the second access port 544 of RB3 540 are all associated with the same pseudo-nickname, PN1.

On the other hand, the third access port 536 of RB2 530 and the third access port 546 of RB3 540 are both coupled to CE3 575, which is coupled to a same second group of RBs, including only RB2 530 and RB3 540. Therefore, the third access port 536 of RB2 530 and the third access port 546 of RB3 540 are associated with a same pseudo-nickname, PN2, different from PN1.

Figure 8:
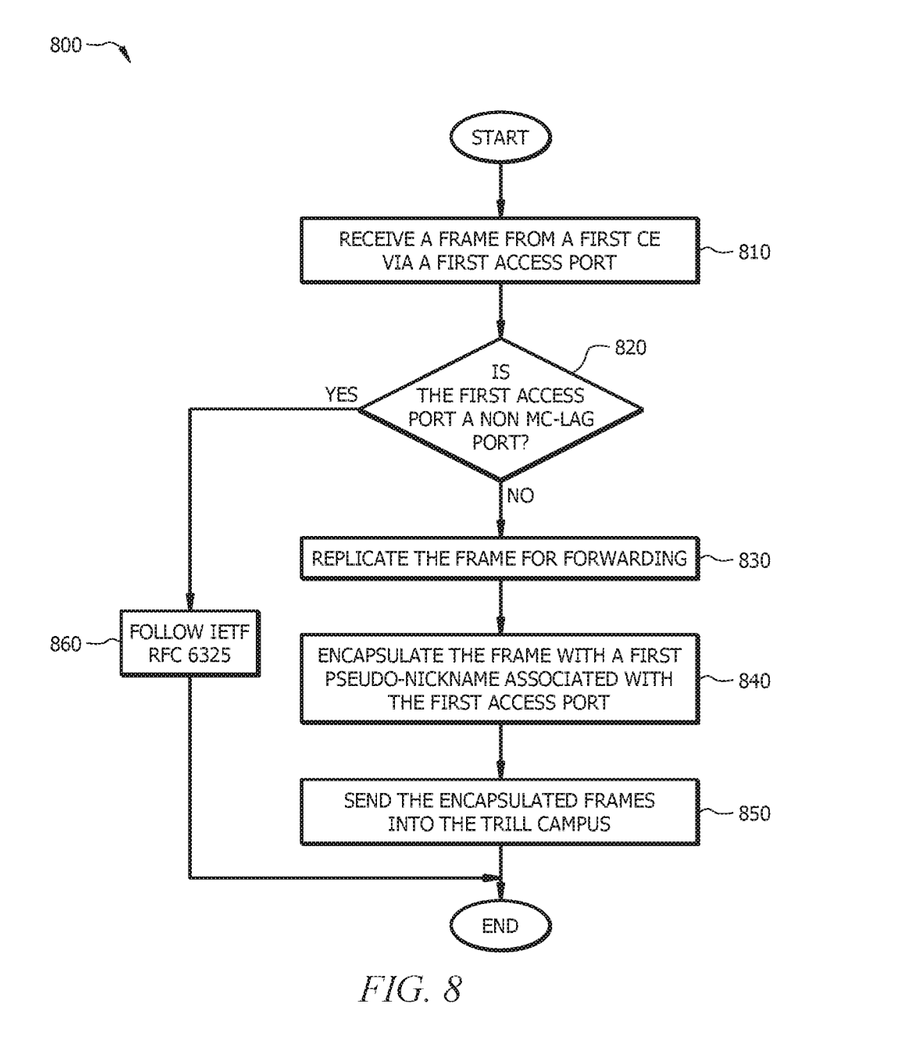
FIG. 8 is a flowchart illustrating a method for implementing active-active access to edges of a transparent interconnection of lots of links (TRILL) campus according to an embodiment of the disclosure.

FIG. 8 is a flowchart illustrating a method 800 for implementing active-active access to edges of a TRILL campus according to an embodiment of the disclosure. The method 800 may be implemented in an ingress RB to ensure that a frame received by the ingress RB from a first CE is forwarded to other CEs. The frame may be one of a broadcast frame, a unicast frame, and a multicast frame. Therefore, the frame is generally referred to as a BUM data frame. The ingress RB is located at an edge of the TRILL campus and is configured to receive the frame directly from the first CE. For example, the ingress RB is RB1 520 in FIG. 6 and RB2 530 in FIG. 7. The first CE is CE1 555 in FIG. 6 and FIG. 7.

At block 810, the frame is received from the first CE via a first access port. For instance, in FIG. 6, a frame is received from CE1 555 via the first access port 522 of RB1 520. For another instance, in FIG. 7, a frame is received from CE1 555 via the first access port 532 of RB2 530.

At block 820, it is determined whether the first access port is a non MC-LAG port. If the first access port is a non MC-LAG port, the method 800 proceeds to block 860. At block 860, the IETF RFC 6325 should be followed. The method for implementing the active-active access to edges of a TRILL campus via non MC-LAG ports is well described in IETF RFC 6325. If the first access port is not a non MC-LAG port, the method 800 proceeds to block 830. For instance, in FIG. 6, the first access port 522 of RB1 520 is not a non MC-LAG port. Therefore, the method 800 proceeds to block 830. For another instance, in FIG. 7, the first access port 532 of RB2 530 is not a non MC-LAG port. Therefore, the method 800 proceeds to block 830.

At block 830, the frame is replicated for forwarding. Block 830 is described in further detail in FIG. 9. At block 840, the frame is encapsulated with a first pseudo-nickname associated with the first access port. For instance, in both FIG. 6 and FIG. 7, the frame is encapsulated with the first pseudo-nickname PN1. Finally, at block 850, the encapsulated frame is sent into the TRILL campus. For instance, in both FIG. 6 and FIG. 7, the encapsulated frame is sent into the TRILL campus 510.

Figure 9:
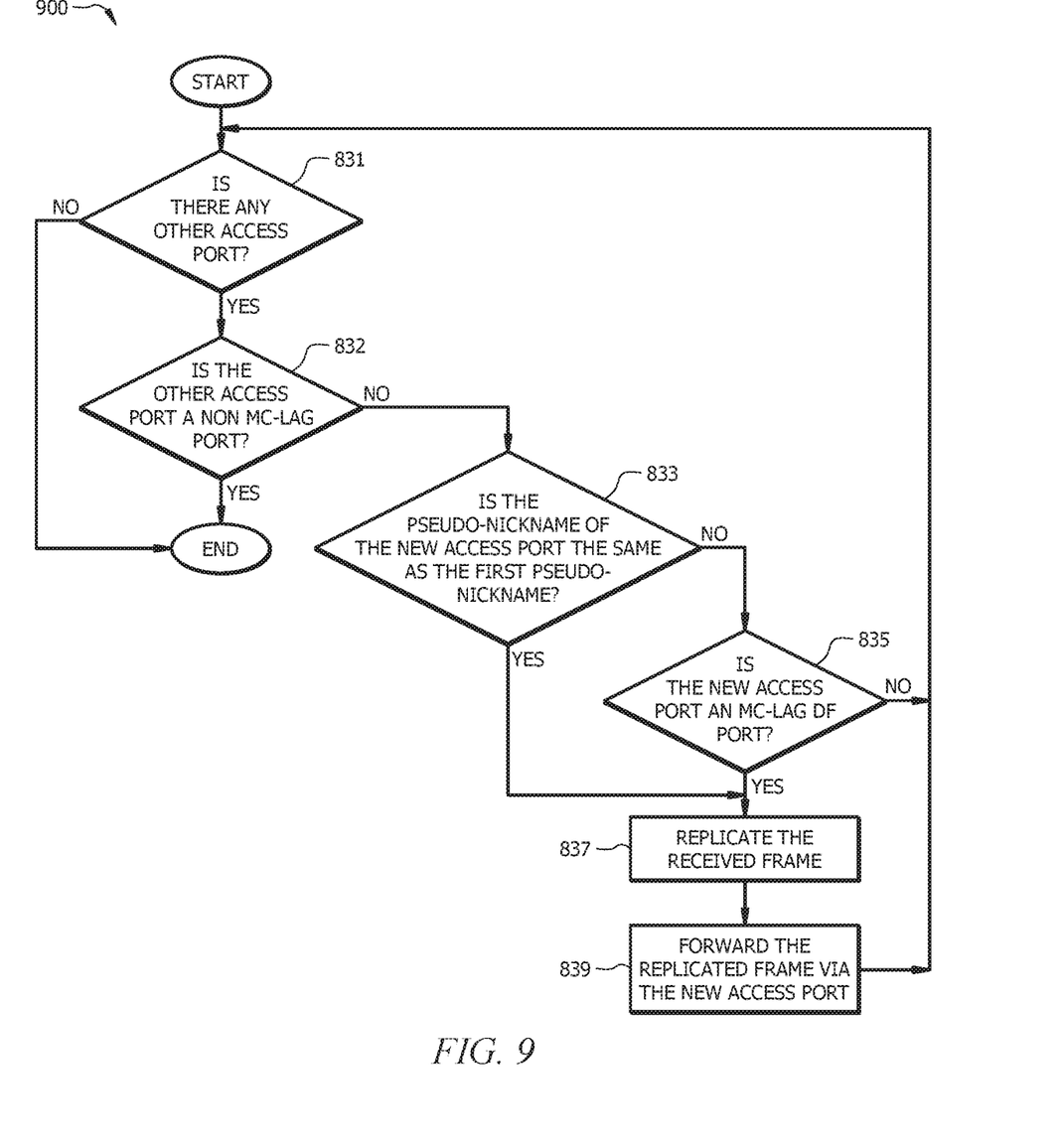
FIG. 9 is a flowchart illustrating a method for replicating a frame for forwarding according to an embodiment of the disclosure.

FIG. 9 is a flowchart illustrating a method 900 for replicating a frame for forwarding, for example, replicating the frame for forwarding as described in block 830 in FIG. 8 according to an embodiment of the disclosure. The method 900 is implemented in an ingress RB to ensure that the frame received by the ingress RB from a first CE is forwarded to other CEs. For example, the ingress RB is RB1 520 in FIG. 6 and RB2 530 in FIG. 7. The first CE is CE1 555 in FIG. 6 and FIG. 7.

At block 831, it is determined whether there is any other access port. If there is no other access port, the method 900 is finished. If there is other access port, the method 900 proceeds to block 832. For instance, in FIG. 6, RB1 520 determines whether there is any access port other than the first access port 522 of RB1 520. The second access port 524 of RB1 520 is such an access port. Therefore, the method 900 proceeds to block 832. For another instance, in FIG. 7, RB2 530 determines whether there is any access port other than the first access port 532 of RB2 530. The second access port 534 of RB2 530 is such an access port. Therefore, the method 900 proceeds to block 832.

At block 832, it is determined whether the other access port is a non MC-LAG port. If the new access port is a non MC-LAG port, the method 900 is finished. If the new access port is not a non MC-LAG port, the method 900 proceeds to block 833. For instance, in FIG. 6, RB1 520 determines the second access port 524 of RB1 520 is not a non MC-LAG port. Therefore, the method 900 proceeds to block 833. For another instance, in FIG. 7, RB2 530 determines the second access port 534 of RB2 530 is not a non MC-LAG port. Therefore, the method 900 proceeds to block 833.

At block 833, it is determined whether the pseudo-nickname of the other access port is the same as the first pseudo-nickname. If the pseudo-nickname of the other access port is the same as the first pseudo-nickname, the method 900 proceeds to block 837. If the pseudo-nickname of the other access port is different from the first pseudo-nickname, the method 900 proceeds to block 835. For instance, in FIG. 6, RB1 520 determines the pseudo-nickname of the second access port 524 of RB1 520 is the same as the first pseudo-nickname, PN1. Therefore, the method 900 proceeds to block 837. For another instance, in FIG. 7, RB2 530 determines the pseudo-nickname of the second access port 534 of RB2 530 is the same as the first pseudo-nickname, PN1. Therefore, the method 900 proceeds to block 837.

At block 835, it is determined whether the other access port is an MC-LAG DF port. If the other access port is an MC-LAG DF port, the method 900 proceeds to block 837. If the other access port is an MC-LAG non-DF port, the method 900 proceeds back to block 831.

At block 837, the received frame is replicated. At block 839, the replicated frame is forwarded via the other access port to a CE that the other access port is coupled with. The method 900 then proceeds back to block 831. For instance, in FIG. 6, the replicated frame is forwarded via the second access port 524 of RB1 520 to CE2 565. The method 900 then proceeds back to block 831. For another instance, in FIG. 7, the replicated frame is forwarded via the second access port 534 to CE2 565. The method 900 then proceeds back to block 831.

Figure 10:
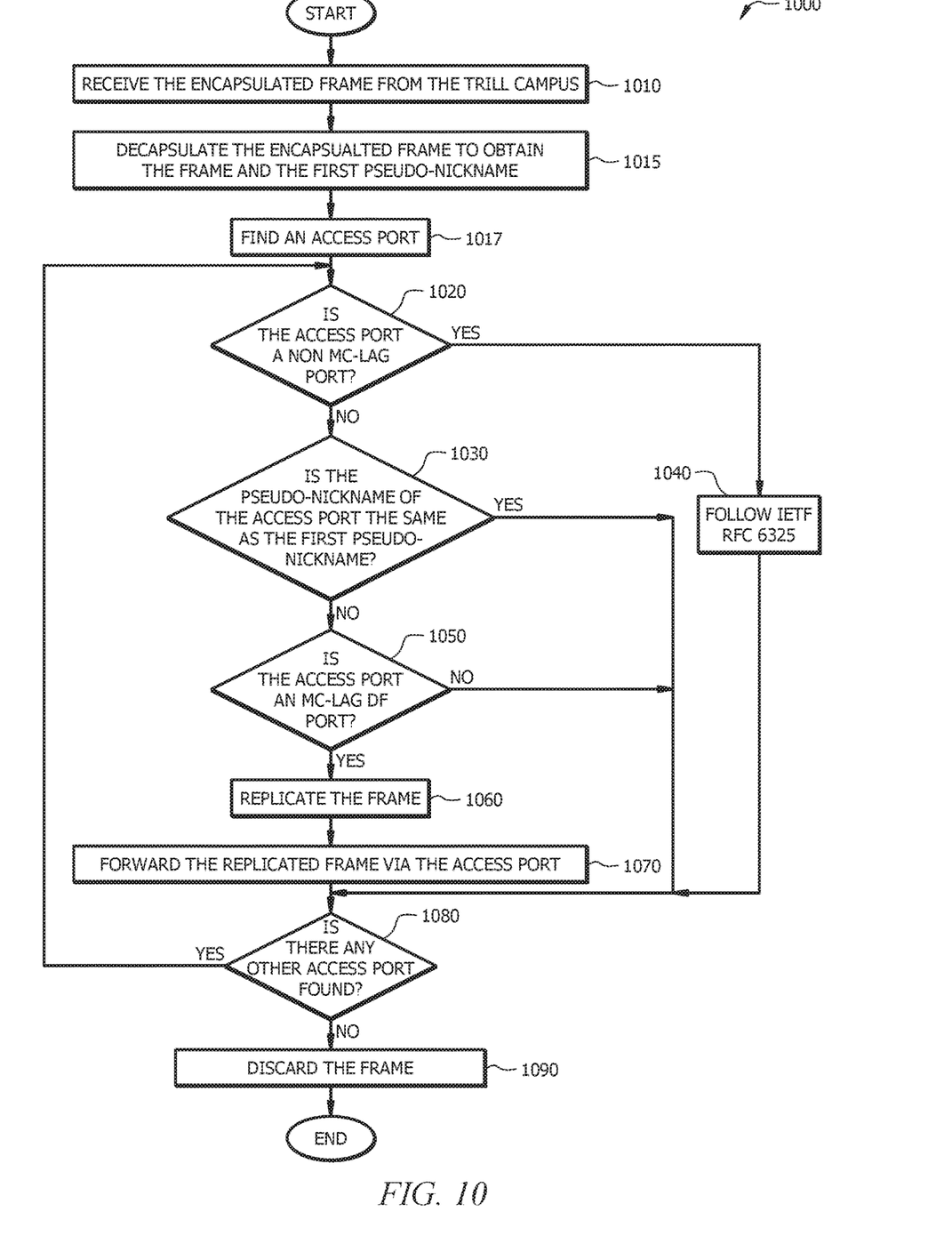
FIG. 10 is a flowchart illustrating another method for implementing active-active access to edges of a TRILL campus.

FIG. 10 is a flowchart illustrating another method 1000 for implementing active-active access to edges of a TRILL campus. The method 1000 may be implemented in an egress RB to ensure that the frame received by the ingress RB from the first CE is forwarded to other CEs that are coupled to the egress RB. The egress RB is located at the edge of the TRILL campus and is configured to forward the frame directly to the other CEs that are coupled to the egress RB. For example, the egress RB is RB2 530 in FIG. 6 and RB3 540 in FIG. 7.

At block 1010, the encapsulated frame is received from the TRILL campus. At block 1015, the received encapsulated frame is decapsulated to obtain the frame and the first pseudo-nickname. For instance, in FIG. 6, RB2 530 receives the encapsulated frame, and then decapsulates it to obtain the first pseudo-nickname PN1 and the frame. For another instance, in FIG. 7, RB3 540 receives the encapsulated frame and decapsulates it to obtain the first pseudo-nickname PN1 and the frame.

At block 1017, an access port is found. For instance, in FIG. 6, the first access port 532 of RB2 530 is found. For another instance, in FIG. 7, the third access port 546 of RB3 540 is found.

At block 1020, it is determined whether the access port is a non MC-LAG port. If the access port is a non MC-LAG port, the method 1000 proceeds to block 1040. At block 1040, the IETF RFC 6325 is followed. Then the method 1000 proceeds to block 1080. If the access port is not a non MC-LAG port, the method 1000 proceeds to block 1030. For instance, in FIG. 6, RB2 530 determines the first access port 532 of RB2 530 is not a non MC-LAG port. Therefore, the method 1000 proceeds to block 1030. For another instance, in FIG. 7, RB3 540 determines the third access port 546 of RB3 540 is not a non MC-LAG port. Therefore, the method 1000 proceeds to block 1030.

At block 1030, it is determined whether the pseudo-nickname of the access port is the same as the first pseudo-nickname. If the pseudo-nickname of the access port is the same as the first pseudo-nickname, the method 1000 proceeds to block 1080. If the pseudo-nickname of the access port is different from the first pseudo-nickname, the method 1000 proceeds to block 1050. For instance, in FIG. 6, RB2 530 determines the pseudo-nickname of the first access port 532 of RB2 530 is the same as the first pseudo-nickname, PN1. Therefore, the method 1000 proceeds to block 1080. For another instance, in FIG. 7, RB3 540 determines the pseudo-nickname of the third access port 546 of RB3 540, PN2 is different from the first pseudo-nickname, PN1. Therefore, the method 1000 proceeds to block 1050.

At block 1050, it is determined whether the access port is an MC-LAG DF port. If the access port is an MC-LAG DF port, the method 1000 proceeds to block 1060. If the access port is not an MC-LAG DF port indicating an MC-LAG non-DF port, the method 1000 proceeds to block 1080. For instance, in FIG. 7, RB3 540 determines the third access port 546 of RB3 540 is an MC-LAG DF port. Therefore, the method 1000 proceeds to block 1060.

At block 1060, the frame is replicated. For instance, in FIG. 7, RB3 540 replicates the frame to generate a replicated frame. At block 1070, the replicated frame is forwarded via the access port. For instance, in FIG. 7, the replicated frame is forwarded via the third access port 546 of RB3 540 to CE3 575.

At block 1080, it is determined whether there is any other access port found in the egress RB. If there is another access port found in the egress RB, the method 1000 returns to the block 1020. If there is no other access port in the egress RB, the method 1000 proceeds to block 1090. For instance, in FIG. 6, RB2 530 determines there are other access ports other than the first access port 532 in RB2 530, including the second access port 534 of RB2 530 and the third access port 536 of RB2 530. Therefore, in FIG. 6, the method 1000 may proceed with either the second access port 534 of RB2 530 or the third access port 536 of RB2 530 to block 1020. For another instance, in FIG. 7, RB3 540 determines there are other access ports other than the third access port 546 in RB3 540, including the first access port 542 of RB3 540 and the second access port 544 of RB3 540. Therefore, in FIG. 7, the method 1000 may proceed with either the first access port 542 of RB3 540 or the second access port 544 of RB3 540 to block 1020.

Finally, when the egress RB determines there is no other access port found at block 1080, the method 1000 proceeds to block 1090. At block 1090, the frame is discarded. The method 1000 is then finished.

Figure 11:
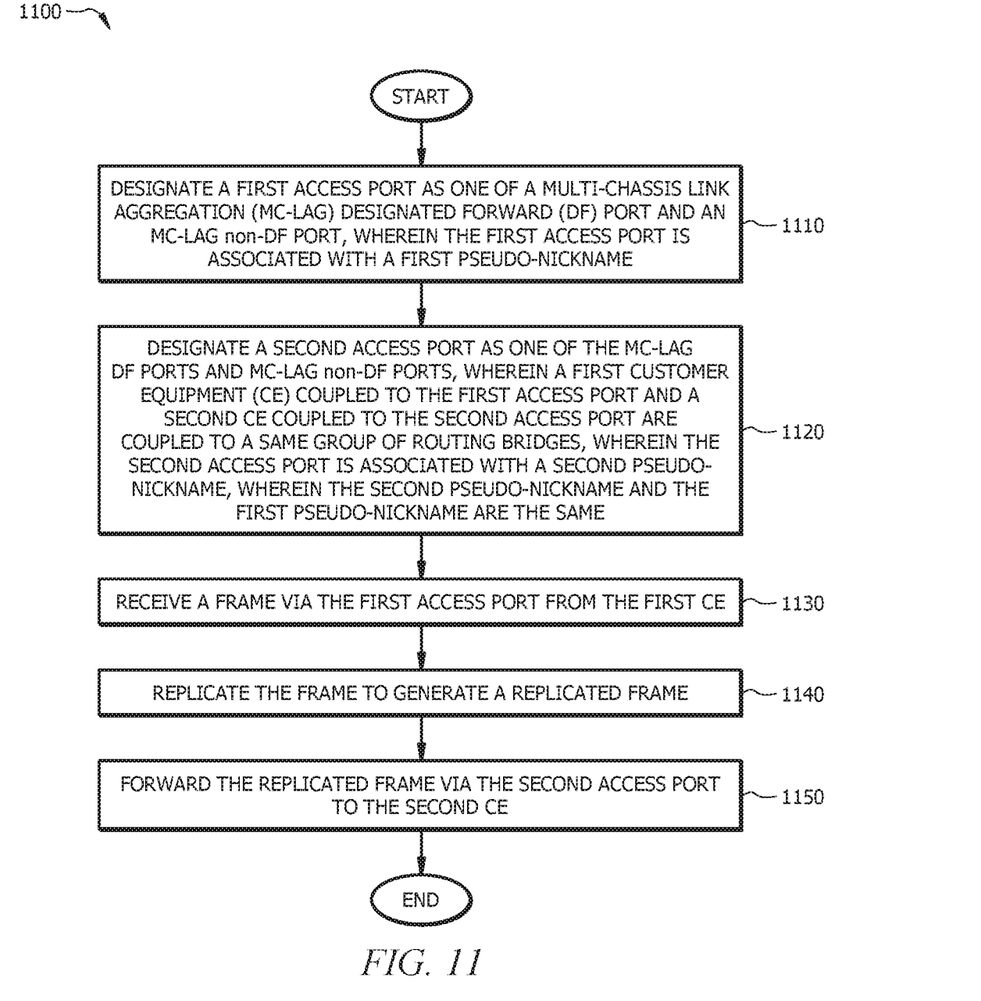
FIG. 11 is a flowchart illustrating a method for implementing active-active access to edges of a TRILL campus according to another embodiment of the disclosure.

FIG. 11 is a flowchart illustrating a method 1100 for implementing active-active access to edges of a TRILL campus according to another embodiment of the disclosure. The method 1100 is implemented in an ingress RB to ensure that a frame received by the ingress RB from a first CE is forwarded to other CEs. The frame may be one of a broadcast frame, a unicast frame, and a multicast frame. Therefore, the frame is generally referred to as a BUM data frame. The ingress RB may be RB1 520 in FIG. 6 and RB2 530 in FIG. 7. In an embodiment, the ingress RB is a router.

At block 1110, a first access port is designated as one of an MC-LAG DF port and an MC-LAG non-DF port, wherein the first access port is associated with a first pseudo-nickname. At block 1120, a second access port is designated as one of the MC-LAG DF ports and MC-LAG non-DF ports, wherein the first CE coupled to the first access port and a second CE coupled to the second access port are coupled to a same group of RBs, wherein the second access port is associated with a second pseudo-nickname, wherein the second pseudo-nickname and the first pseudo-nickname are the same. In an embodiment, each of the first CE and the second CE is one of a computer and a server.

At step 1130, a frame is received via the first access port from the first CE. In an embodiment, the frame is a BUM data frame. At step 1140, the frame is replicated to generate a replicated frame. At step 1150, the replicated frame is forwarded via the second access port to the second CE.

Figure 12:
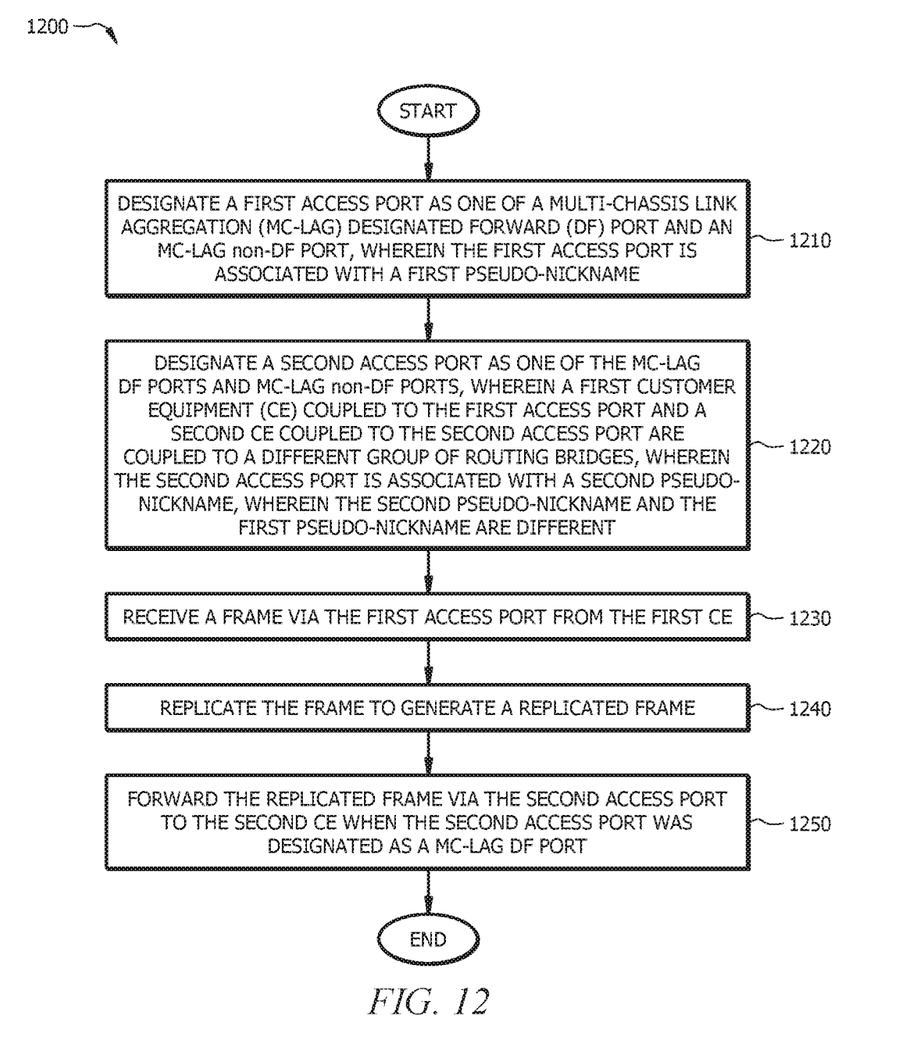
FIG. 12 is a flowchart illustrating a method for implementing active-active access to edges of a TRILL campus according to yet another embodiment of the disclosure.

FIG. 12 is a flowchart illustrating a method 1200 for implementing active-active access to edges of a TRILL campus according to yet another embodiment of the disclosure. The method 1200 may be implemented in an ingress RB to ensure that a frame received by the ingress RB from a first CE is forwarded to other CEs. For example, the ingress RB is RB1 520 in FIG. 6 and RB2 530 in FIG. 7. In an embodiment, the ingress RB is a router. The frame may be one of a broadcast frame, a unicast frame, and a multicast frame. Therefore, the frame is generally referred to as a BUM data frame.

At block 1210, a first access port is designated as one of an MC-LAG DF port and an MC-LAG non-DF port, wherein the first access port is associated with a first pseudo-nickname. At block 1220, a second access port is designated as one of the MC-LAG DF ports and MC-LAG non-DF ports, wherein the first CE coupled to the first access port and a second CE coupled to the second access port are coupled to a different group of RBs, wherein the second access port is associated with a second pseudo-nickname, and wherein the second pseudo-nickname and the first pseudo-nickname are different. In an embodiment, each of the first CE and the second CE is one of a computer and a server.

At block 1230, a frame is received via the first access port from the first CE. In an embodiment, the frame is a BUM data frame. At block 1240, the frame is replicated to generate a replicated frame. At block 1250, the replicated frame is forwarded via the second access port to the second CE when the second access port was designated as a MC-LAG DF port.

While several embodiments have been provided in the present disclosure, it may be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and may be made without departing from the spirit and scope disclosed herein.

What is claimed is:

1. An apparatus configured to provide active-active access to a transparent interconnection of lots of links (TRILL) campus, comprising:
    a first access port associated with a first customer equipment (CE) and a second access port associated with a second CE, the first access port configured to receive a frame from the first CE;
    a processor coupled to the first access port and the second access port, the processor configured to:
    replicate the frame to generate a replicated frame;
    determine that a pseudo-nickname associated with the first access port and the pseudo-nickname associated with the second access port are the same; and
    determine that the first access port and the second access port are associated with different multi-chassis link aggregations (MC-LAGs); and
    a transmitter coupled to the processor, the transmitter configured to forward the replicated frame to the second CE using the second access port.

2. The apparatus of claim 1, wherein the processor is configured to encapsulate the frame to generate an encapsulated frame.

3. The apparatus of claim 2, wherein the processor is configured to associate the encapsulated frame with the pseudo-nickname.

4. The apparatus of claim 3, wherein the transmitter is configured to multicast the encapsulated frame to the TRILL campus.

5. The apparatus of claim 1, wherein the apparatus is a routing bridge or a router.

6. The apparatus of claim 1, wherein the frame is a flooded broadcast, unicast, or multicast (BUM) data frame.

7. An apparatus configured to provide active-active access to a transparent interconnection of lots of links (TRILL) campus, comprising:
    a first access port associated with a first customer equipment (CE) and a second access port associated with a second CE, the first access port configured to receive a frame from the first CE;
    a processor coupled to the first access port and the second access port, the processor configured to:
    replicate the frame to generate a replicated frame;
    determine that a pseudo-nickname associated with the first access port and a pseudo-nickname associated with the second access port are different; and
    determine that the second access port is a designated forwarding port; and
    a transmitter coupled to the processor, the transmitter configured to forward the replicated frame to the second CE using the second access port.

8. The apparatus of claim 7, wherein the processor is further configured to encapsulate the frame to generate an encapsulated frame.

9. The apparatus of claim 8, wherein the encapsulated frame is associated with the pseudo-nickname associated with the first access port.

10. The apparatus of claim 9, wherein the transmitter is further configured to multicast the encapsulated frame to the TRILL campus.

11. The apparatus of claim 7, wherein the apparatus is a routing bridge or a router.

12. The apparatus of claim 7, wherein the frame is a flooded broadcast, unicast, or multicast (BUM) data frame.

* * * * *

UNITED STATES PATENT AND TRADEMARK OFFICE
CERTIFICATE OF CORRECTION

PATENT NO. : 10,757,066 B2
APPLICATION NO. : 16/133374
DATED : August 25, 2020
INVENTOR(S) : Donald Eggleston Eastlake, III et al.

Page 1 of 1

It is certified that error appears in the above-identified patent and that said Letters Patent is hereby corrected as shown below:

On the Title Page

Page 2, Second column, Lines 20-22, should read:
Hao, W., et al., "The problem statement of RBridge edge group state synchronization,"
draft-hao-trill-rb-syn-02.txt, Feb. 12, 2014, 16 pages.

Page 2, Second column, Lines 29-31, should read:
Foreign Communication From A Counterpart Application, Chinese Application No. 201580001567.3,
Chinese Office Action dated May 2, 2018, 3 pages.

Signed and Sealed this
Twenty-ninth Day of September, 2020

Andrei Iancu
*Director of the United States Patent and Trademark Office*